US008396251B2

(12) United States Patent
Mirbach et al.

(10) Patent No.: US 8,396,251 B2
(45) Date of Patent: Mar. 12, 2013

(54) METHOD FOR DETERMINING THE POSITION OF AN OBJECT FROM A DIGITAL IMAGE

(75) Inventors: Bruno Mirbach, Konz (DE); Marta Castillo Franco, Bascharage (LU); Romuald Ginhoux, Luxembourg (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 954 days.

(21) Appl. No.: 11/720,473

(22) PCT Filed: Nov. 28, 2005

(86) PCT No.: PCT/EP2005/056267
§ 371 (c)(1), (2), (4) Date: Nov. 15, 2007

(87) PCT Pub. No.: WO2006/058872
PCT Pub. Date: Jun. 8, 2006

(65) Prior Publication Data

US 2009/0129628 A1 May 21, 2009

(30) Foreign Application Priority Data

Nov. 30, 2004 (EP) .................................... 04106185

(51) Int. Cl.
*G06K 9/00* (2006.01)

(52) U.S. Cl. ....................................................... 382/106

(58) Field of Classification Search .................. 382/104, 382/106, 154
See application file for complete search history.

(56) References Cited

U.S. PATENT DOCUMENTS

| | | | | |
|---|---|---|---|---|
| 5,802,202 | A * | 9/1998 | Yamada et al. | 382/154 |
| 5,983,147 | A | 11/1999 | Krumm et al. | |
| 6,548,804 | B1 | 4/2003 | Yuhara et al. | |
| 7,916,898 | B2 * | 3/2011 | Anderson | 382/104 |
| 7,987,079 | B2 * | 7/2011 | Billinghurst et al. | 703/7 |
| 2002/0131095 | A1 | 9/2002 | Koike | |
| 2004/0032970 | A1 * | 2/2004 | Kiraly | 382/103 |
| 2004/0114033 | A1 * | 6/2004 | Eian et al. | 348/42 |
| 2005/0264527 | A1 * | 12/2005 | Lin | 345/156 |

FOREIGN PATENT DOCUMENTS

| | | |
|---|---|---|
| EP | 0626654 | 11/1994 |
| EP | 1 270 329 | 1/2003 |
| EP | 1 434 169 | 6/2004 |

OTHER PUBLICATIONS

Eian et al. ("A single-camera method for three-dimensional video imaging," Journal of Neuroscience Methods 120, 2002, pp. 65-83).*
Heikkila, ("Geometric Camera Calibration using Circular Control Points ," IEEE Transaction on Pattern Analysis and Machine Intelligence, vol. 22, No. 10, Oct. 2000, pp. 1066-1077).*
International Search Report; PCT/EP2005/056267; Jan. 16, 2006.

* cited by examiner

*Primary Examiner* — Yubin Hung
(74) *Attorney, Agent, or Firm* — Cantor Colburn LLP

(57) ABSTRACT

Method for determining the position of an object point in a scene from a digital image thereof acquired through an optical system is presented. The image comprises a set of image points corresponding to object points and the position of the object points are determined by means of predetermined vectors associated with the image points. The predetermined vector represents the inverted direction of a light ray in the object space that will produce this image point through the optical system comprising all distortion effects of the optical system.

9 Claims, 2 Drawing Sheets v
u
$(u_{ci}, v_{ci})$
$e_i$
$(a_i, b_i)$
$u_d$
$v_d$

METHOD FOR DETERMINING THE POSITION OF AN OBJECT FROM A DIGITAL IMAGE

TECHNICAL FIELD OF THE INVENTION

The present invention generally relates to the determination of object positions using camera imaging. The invention more specifically relates to the determination of the position of objects in a scene from a digital image thereof, especially for use with vehicle occupant protection systems.

BRIEF DESCRIPTION OF RELATED ART

Automotive occupant protection systems including airbags and passive seat belt mechanisms are well know in the art, and equip most of the vehicles now produced. The deployment or actuation of such protection systems is typically based on acceleration sensors that will output a trigger signal when the sensed acceleration exceeds a predetermined threshold.

While the introduction of airbags has proved successful in reducing the severity of injuries suffered in accidents, they can also, in certain circumstances, cause serious, sometimes fatal, injuries to vehicle occupants that are e.g. too small or improperly seated. This may for example be the case in situations where: a rear-facing infant seat is installed in the front seat of a vehicle; the driver is too close to the steering-wheel; the passenger is too close to the dashboard; or a child is sitting in the front passenger seat. In such cases, it may be preferable to deactivate the airbag or adapt the airbag deployment conditions to the occupant.

Therefore, control systems have been developed that take into account variations in passenger/occupant conditions, to tailor the airbag deployment depending on the specific type of occupant present in the vehicle.

A variety of vision-based control systems for detecting the type and position of vehicle occupants have been proposed. They typically comprise at least one camera featuring an optical system (including one or more lenses) as well as an image sensor array for capturing images of seat regions. The spatial confinement in the vehicle usually requires a wide angle lens to be able to survey the occupant area in the vehicle. The acquired images are processed in the control system to detect and classify vehicle occupants, and this occupancy classification is then used as input for airbag control.

An inherent technical problem of vision-based control systems is the optical distortion of light passing through the camera lens. For example, the so-called barrel distortion is a well-known effect observed with wide-angle lenses. A straight line appears to be curved in the image due to this distortion, which means that every image point appears to be displaced.

Therefore, image pre-processing is often used to remove distortion, and the occupant position is determined from the obtained corrected, undistorted images. This obviously requires a lot of data processing, high computing power and high storage capacity. Furthermore, the distortion removal processes typically introduce approximations in the position of objects in the corrected images, which obviously also affects position determination from such corrected images.

U.S. Pat. No. 6,005,958 describes a method and system for detecting the type and position of a vehicle occupant utilizing a single camera unit, which is capable of determining between objects, forwardly or rearwardly facing infant seats, and adult occupants by periodically mapping an image taken of the interior of the vehicle into image profile data, and utilizing image profile matching with stored reference profile data to determine the occupant or object type. Instantaneous distance is also measured and changes in the measured distances are tracked. All of this information is then used to optimise deployment control of occupant protection systems.

WO 02/078346 describes a method for correcting an image, in particular for occupant protection systems, wherein a source image that is distorted by camera optics is transformed into a corrected image by using a tabular imaging rule. No, one or several target pixels in the target image are assigned to each source pixel of the source image. This transformation occurs directly during the reading out from the image sensor, i.e. in real-time. In this method, the source image is transformed into an undistorted target image of reduced size, which saves storage capacity. Such a transformation rule however introduces approximations, which lead to inaccuracies in position determination based on such distortion corrected images.

BRIEF SUMMARY OF THE INVENTION

The invention provides an improved method for determining object positions from a digital image.

The present invention proposes a method for determining the position of an object point (which may generally be a point in an extended object) in a scene from a digital image of this scene acquired through an optical system, the image comprising an image point corresponding to an object point. According to an important aspect of the invention, the position of the object point is determined by means of a predetermined vector associated with the image point, the predetermined vector representing the direction of a light ray in the object space that will produce this image point through the optical system. In other words, such a predetermined vector gives an indication of the direction of the object point from which the light, producing the image point, has emerged.

Contrary to known methods for determining object positions, which involve image transformation to provide a corrected, undistorted image, the present method is based on a mapping of the image points backward in the object space by means of vectors indicating the direction of light rays actually producing these image points. Such vectors include the optical distortion through the optical system and thus allow an accurate position determination of object points in the observed scene without any transformation of the original image data. The method is further advantageous in that it does not require any approximations to the image data nor additional computing power.

The correct position information obtained by the present method can then advantageously be used for occupancy classification in the control of automotive occupant protection systems, such as an airbag system.

The predetermined vector associated with an image point preferably indicates the direction of a light ray passing through the optical centre of the lens assembly of the optical system. This gives a univocal indication of the direction of the object point from which the light ray, producing the image point, has emerged.

A distance information is advantageously associated with each image point, which is indicative of the measured remoteness of the corresponding object point. In such a case, the position of an object point may be determined based on the predetermined vector and the distance information.

In a preferred embodiment, the optical system comprises a lens assembly and the image of the observed scene through the optical system is acquired by an image sensor array optically coupled to the lens assembly. The acquired image contains a number of image points that correspond to object points. A distance information is preferably associated with each image point. A grey value may conventionally also be associated with each image point. A respective predetermined vector is associated with each image point, representing the direction of a light ray in the object space that will produce this image point on the sensor array after passing through the lens assembly. The predetermined vector preferably indicates the direction of a light ray passing through the optical centre of the lens assembly.

This embodiment thus allows to determine the 3D position of an object in the observed scene (e.g. passenger compartment) based on the predetermined vector and distance information. This approach does not require the computation of a new corrected image, but permits to directly derive the 3D position of objects from the uncorrected image acquired by the sensor, thereby radically differing from prior art solutions.

The predetermined vectors are advantageously obtained by calibration. The calibration will include a step of identifying for given areas (pixels) of the image sensor the light rays in the object space that will respectively fall onto these areas when passing through the optical system. Such calibration procedures are known in the art and need not be explained in detail herein. Following this identification step, the directions of these rays are then used to calculate the predetermined vectors. It will be understood that the predetermined vectors correspond to a given configuration of the optical system and need not be systematically recalculated for each image. The predetermined vectors may thus advantageously be memorized or stored.

Each predetermined vector is preferably a unitary vector in a reference coordinate system. This allows to determine the coordinates of an object point corresponding to an image point by simply multiplying the measured distance information by the predetermined vector associated with this image point. This reference coordinate system may e.g. be the camera coordinate system, i.e. a three-dimensional coordinate system having its origin coinciding with the optical centre of the optical system.

If desired, the vectors, respectively unit vectors, in the reference coordinate system may be transformed to be used in another coordinate system by conventional calculations. For the application of occupant classification in a vehicle, the preferred coordinate system would be the vehicle coordinate system rather than the camera coordinate system.

Although the present method is particularly well suited for use in automotive occupant protection system, it can be used for a variety of applications requiring the determination of object positions from digital images.

The present method can be implemented to extract position information of objects from pictures obtained with a variety of optical systems. For 3-D coordinate determination of objects it is advantageous to use a camera acquiring a distance information for each pixel (i.e. each point of the image). However, the distance information may also be determined by any appropriate method (e.g. stereoscopy), and afterwards associated with the corresponding image point. In this connection, the present method could be applied with images acquired by either of the two cameras of a stereoscopic camera system.

BRIEF DESCRIPTION OF THE DRAWINGS

The present invention will now be described, by way of example, with reference to the accompanying drawings, in which.

DETAILED DESCRIPTION OF PREFERRED EMBODIMENTS

A preferred embodiment of the present method will now be explained in detail. The specificities and advantages of the present method will become more apparent by comparison to the conventional approach of coordinate determination by camera imaging.

The Pinhole Camera Model

The ideal camera (so-called pinhole camera) performs a pure perspective projection of a scene. This projection—used herein for explanatory purpose—can be described as a simple mapping from the so-called camera coordinate system r=(x, y,z) to the image coordinate system (u,v) by the simple relations $$u=x\cdot f/z \text{ and } v=y\cdot f/z. \quad (1)$$

Thereby the projection centre is the origin O=(0,0,0) of the camera coordinate system. The projection plane P spanned is parallel to the (x,y) plane and is displaced with a distance f (the focal length) from O along the z-axis (the optical axis).

Figure 1:
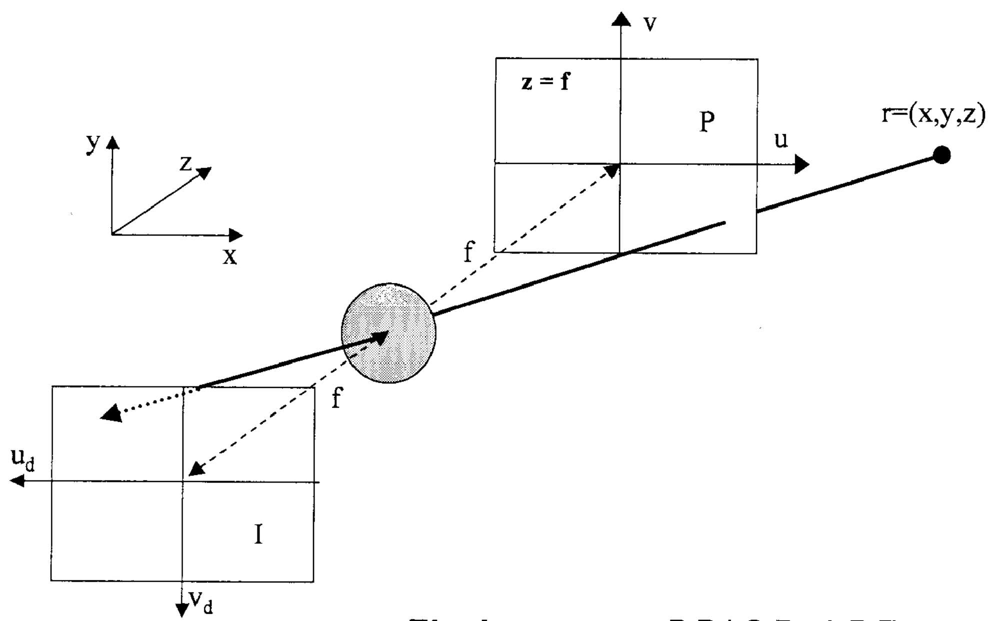
FIG. 1: is a diagram illustrating the principle of the pinhole camera model.

Ideally, light rays coming from the scene should pass through the optical centre linearly (FIG. 1). In that case, a point intersecting the projection plane at position (u,v) will be mapped on a point $$(u_d,v_d)=(u,v) \quad (2)$$

in the image. Thereby, the image plane I is assumed to be placed at a distance f from the optical centre behind the camera lens with the axes parallel to the camera coordinate system, i.e. the image plane is just the mirrored projection plane.

There are 3D-cameras under development that can acquire a distance value $d=|r|=\sqrt{x^2+y^2+z^2}$ for every pixel. This distance, together with the position $(u_d, v_d)$ of the corresponding pixel on the image, gives the (x,y,z)-coordinates of the corresponding object point via the equations $$z=d\cdot f/\sqrt{f^2+u_d^2+v_d^2},$$

$$x=u_d\cdot z/f,$$

$$y=v_d\cdot z/f. \quad (3),$$

being just the inversion of equations (1) and (2).

Figure 2:
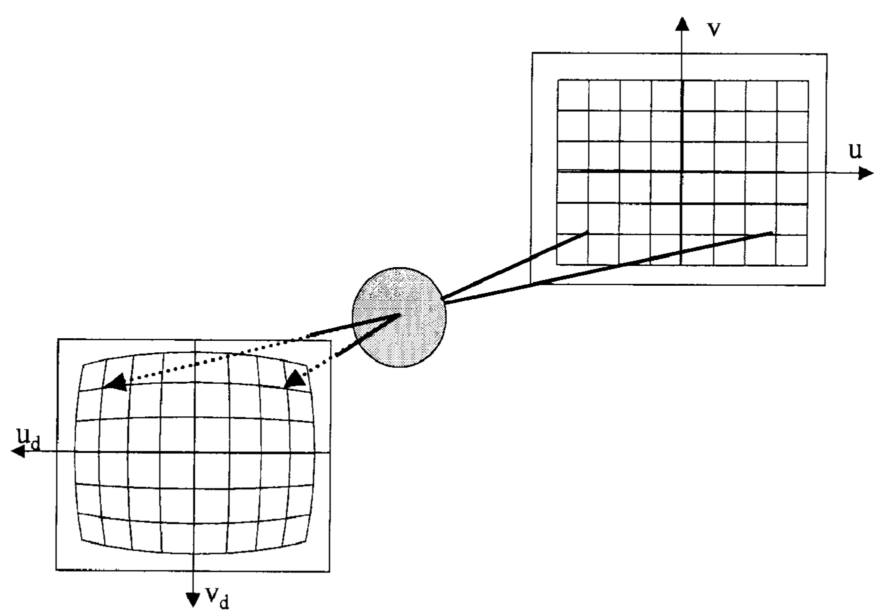
FIG. 2: is a diagram illustrating the barrel distortion phenomenon.

In practice, camera lens systems do not show the ideal, simple, mapping (2) but introduce some non-linear distortion to the optical paths and thus in the resulting image. An example of the so-called barrel distortion that typically occurs for wide angle lenses is shown in FIG. 2. Straight lines appear to be curved since the image coordinates $(u_d, v_d)$ are displaced with respect to the corresponding projection points (u,v) and equation (2) becomes $$(u_d,v_d)=F(u,v) \quad (4).$$

In addition to a radial distortion, there are other distortions like tangential distortion or distortions due to a displacement of the image sensor array from the correct position that can all be represented by the non-linear function F (eq. 4). For a 3D-camera, all kinds of image distortions will generate displacements of the calculated (x,y,z) position from the real position due to the displacement of the image coordinates) $(u_d,v_d)$.

Conventional Distortion Rectification 2D-cameras record a matrix of grey values $g_i$ where the matrix consists of pixels placed in certain fixed positions $(a_i,b_i)$ in the image plane. 3D-cameras record not only a grey value, but also a distance value at every pixel position.

Conventional image rectification aims at reconstructing an ideal image from the values $g_i$ obtained in a distorted image, i.e. an image one would obtain with a pinhole camera. This image rectification preferably requires first a calibration of the camera and involves the determination of the function F (eq. 4) that describes the displacement.

This can be done by comparing certain reference pattern(s) with images thereof taken from various points of view. There are various calibration methods based on well established camera models (see e.g. Janne Heikkilä, *Geometric Camera Calibration using Circular Control Points*, IEEE Transactions on Pattern Analysis and Machine Intelligence, Vol 20, p 1066-1074, (2000), R. Y. Tsai, *A Versatile Camera Calibration Technique for High Accuracy* {*3D*} *Machine Vision Metrology Using Off-the-Shelf TV Cameras and Lenses*, IEEE J. Robotics Automat., pages 323-344, Vol. RA-3 (1987)) and need not be described herein in detail.

Figure 3:
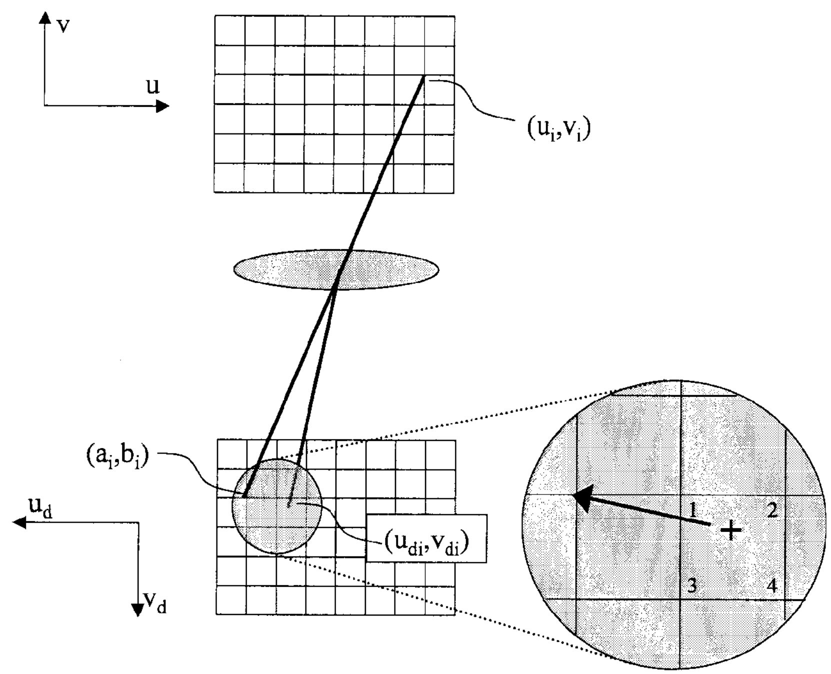
FIG. 3: is a diagram illustrating a conventional distortion correction method.

FIG. 3 shows how the image rectification is conventionally performed once the calibration function is determined. For every pixel i the pixel position $(a_i,b_i)$ is ideally mapped backward onto the projection plane P, i.e. it is mapped backward as if the camera was a pinhole camera. From the projection point $(u_i,v_i)=(a_i,b_i)$ the corresponding displaced position $(u_{di},v_{di})$ on the image plane is calculated by using the distortion function (4). The arrow in FIG. 3 indicates the displacement between the pixel position $(a_i,b_i)$ and the displaced image position of the pixel. To construct an ideal image, the 4 pixels around the distorted position $(u_{di},v_{di})$ are determined, and the grey value of pixel i in the ideal image is substituted by the grey value of the nearest of the four pixels or by a linear combination of the grey values of the four pixels. This process is performed for every pixel yielding a rectified image. A method for performing this rectification in real time systems has for example been described in WO 02/078346A1.

It is to be noted that a rectified image is, however, always only an approximation to a non-distorted image due to the procedure described above. Either the pixel displacement is only correct up to ½ of a pixel size, if the nearest neighbour correction is used, or the image is smoothed and has lost contrast.

The same rectification procedure can be applied if the image matrix contains distance data instead of (or in addition to) grey value data. The $(x_i,y_i,z_i)$ coordinates computed from the pixel positions $(a_i,b_i)$ and the rectified distance data via formulas (3) will, however, be inaccurate due to the approximations described above. Moreover, in the rectification process the information of some of the corner pixels will thus be discarded and thus be lost for further image processing.

Distortion-Free Coordinate Determination from 3D-Camera Data Using the Present Method The present method proposes determining the position of object points in a scene from a digital image of this scene, by means of predetermined vectors associated with the image points (one vector per image point), these vectors indicating the directions in the observed scene from which the light rays which produce the respective image points, emerge. The use of these vectors, which include the optical distortion of the camera, permits an accurate determination of the position of objects (or object points) from the digital image.

The present method is particularly well suited for use in occupancy classification methods for automotive occupant protection systems, such as airbags, in order to tailor the airbag deployment to the occupant type and position.

Therefore, the digital image may be acquired by means of a camera system arranged at a location so as to have a field of view covering the driver and/or the passenger seating areas. Preferably, the camera is of the 3-D type that allows to obtain a distance value for each pixel. Such 3-D cameras are known in the art and need not be described in detail herein.

The camera, which may operate in the visible or preferably the IR range, basically includes an optical system with one or more lenses and an image sensor array operatively coupled to the optical system so that the sensor array translates the observed scene into a two-dimensional digital image. The image sensor array may be of the CCD or CMOS type. The acquired digital image is thus composed of a plurality of pixels that form the image points reflecting the image of the scene through the optical system. The distance information acquired for each pixel may e.g. be determined based on time of flight measurement of light.

In practice, a time of flight camera may have one lens operatively coupled to one image sensor array as well as a modulated light source. The method can also be implemented with a so-called stereo camera. Such a camera typically has two lenses and two image sensor arrays, and may further have an additional (non-modulated) light source. In the latter case, the method could be applied to images obtained from either of the two lenses.

As will appear from the following description, the present embodiment of the method permits an accurate determination of three dimensional coordinates of object points from digital images acquired by such a 3D-camera, without requiring any transformation of the image. This further avoids introducing approximations in the images and the need for additional computing power.

It is to be noted that the digital images (acquired by the camera) need not be rectified and will thus preferably stay unchanged. Instead, a set of predetermined vectors expressed in a reference three-dimensional coordinate system is used. This reference coordinate system preferably has its centre coinciding with the optical centre of the camera lens assembly. Furthermore, the predetermined vectors should preferably indicate the direction of a light ray passing through the centre of the optical system.

Figure 4:
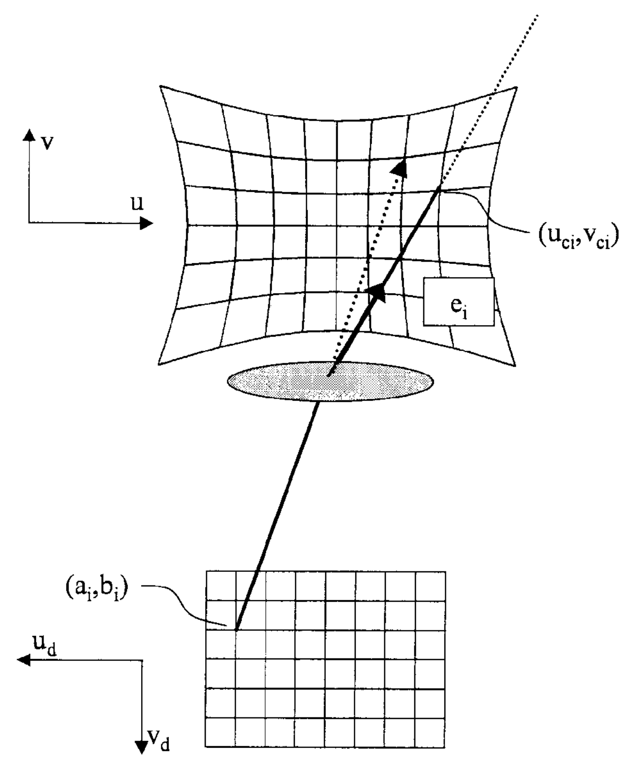
FIG. 4: is a diagram illustrating the principle of unit vector determination.

Advantageously, these vectors are calculated as unit vectors in a reference coordinate system (FIG. 4). This means that the coordinates of an object point corresponding to a given pixel of the sensor array may simply be obtained by multiplying the unit vector by the measured distance.

For each pixel i there shall thus be a determined unit vector $e_i$ that indicates the direction in the object space of a light ray that will fall on that pixel after passing through the optical system. This means that the unit vector $e_i$ allows projecting back an image point in the projection plane as shown in FIG. 4, so that, in practice, a unit vector preferably indicates the inverted direction of the light ray (as shown in FIG. 4). It will however be understood that what matters is that the unit vector, resp. predetermined vector, be a directing vector of the light ray (i.e. indicating the global orientation of the light ray).

Although, as mentioned above, a vector may be determined for each pixel of the image sensor array, some regions of the image sensor array may, in practice, not receive relevant information. There is thus no need to calculate the vectors for the pixels located in these regions of the sensor array.

Determination of the Unit Vectors Comprising Optical Distortion

A prerequisite for the coordinate determination of object points is the calculation of the set of predetermined vectors. As already explained, this shall be done by calibration, for a given camera configuration and basically involves the identification, for each pixel of the image sensor, of the direction of the light rays in the object space that will fall onto the respective pixel.

These directions, are preferably determined using a reciprocal distortion function F'

$$(u,v)=F'(u_d,v_d) \tag{5}$$

How this reciprocal distortion function can be obtained within a calibration process is discussed by Heikkilä (see above).

For every pixel i, the reciprocal distortion function will map backward the pixel position $(a_i,b_i)$ to its projection point $(u_{ci},v_{ci})$ in the projection plane P (see FIG. 4). This is then exactly the point in the projection plane which will be mapped onto pixel i by the camera optics. Normalizing the point $(x_i,y_i,z_i)=(u_{ci},v_{ci},f)$ to unit length then yields the unit vector pointing from the optical centre to the direction of the projection point, i.e.:

$$e_i = \begin{pmatrix} e_i^x \\ e_i^y \\ e_i^z \end{pmatrix} = \frac{1}{\sqrt{u_{ci}^2 + v_{ci}^2 + f^2}} \cdot \begin{pmatrix} u_{ci} \\ v_{ci} \\ f \end{pmatrix} \text{ for all } i. \tag{6}$$

Calculating Correct Coordinates Using Unit Vectors

Once the unit vectors are calculated, they can be stored and need not be recalculated during image acquisition. The calculation of the 3D-coordinates in the camera coordinate system is then just realized by multiplying distance value $d_i$ measured at pixel i with the corresponding unit vector $e_i$, i.e.

$$r_i = \begin{pmatrix} x_i \\ y_i \\ z_i \end{pmatrix} = d_i \cdot e_i = d_i \cdot \begin{pmatrix} e_i^x \\ e_i^y \\ e_i^z \end{pmatrix} \text{ for all } i. \tag{7}$$

Since the unit vectors are preferably stored, it is not necessary to perform a new calibration each time the method is implemented, but the unit vectors may simply be retrieved from their storage location. This implies an important gain of computing time and data processing compared to methods which involve image transformation for position determination.

Coordinate Calculation with Respect to a World Coordinate System.

In the present method, the coordinates of the object points are determined in the camera coordinate system. However, if the coordinates with respect to another coordinate system (so-called "world coordinate system") shall be calculated, one can generate a world unit vector system from the camera unit vector system.

Usually the transformation from one coordinate system to another is realized by a so-called homogeneous transformation that includes a 3×3 rotation matrix R and a translation vector T. Applying the rotation matrix R to each of the unit vectors $e_i$ of the camera coordinate system yields the unit vectors $e_i^w$ in the world coordinate system, i.e.

$$e_i^w=R\cdot e_i \text{ for all } i. \tag{8}$$

Again, these unit vectors of the world coordinate system have only to be computed once and can be kept in memory during runtime. The coordinate calculation during runtime is in this case realized by the simple formula $$r_i^w = \begin{pmatrix} x_i^w \\ y_i^w \\ z_i^w \end{pmatrix} = d_i \cdot e_i^w + T \text{ for all } i. \tag{9}$$

The invention claimed is:

1. Method for determining a position of an object point in a scene comprising a plurality of object points from a digital image of the scene acquired with an optical system having an image sensor array optically coupled to a lens assembly, the method comprising:

preliminarily determining predetermined vectors via preliminary calibration, and associating said predetermined vectors with respective pixels of said image sensor array, wherein each predetermined vector represents the direction of a light ray in said scene that falls onto said respective pixel of said image sensor array when passing through said lens assembly, said predetermined vectors accounting for optical distortion through said lens assembly;

storing said predetermined vectors within said optical scene;

acquiring a digital image of a further scene through said optical system using said image sensor array, said image including a plurality of image points corresponding to a plurality of object points from the further scene;

measuring and associating distance information of said object points with said image points that correspond with said object points;

storing and said distance information within said optical system;

determining three dimensional coordinates of said object points, said determining occurring based on said stored predetermined vectors and said stored distance information associated with image points corresponding to said object points.

2. Method according to claim 1, wherein each predetermined vector indicates the direction of a light ray passing through the optical centre of the lens assembly of said optical system.

3. Method according to claim 1, wherein each predetermined vector is determined by calibration.

4. Method according to claim 1, wherein said distance information of an object point is indicative of the measured remoteness of said object point.

5. Method according to claim 4, wherein each predetermined vector is a unitary vector in a reference coordinate system; and the coordinates of an object point corresponding to an image point are determined by multiplying the measured distance information by the predetermined vector associated with this image point.

6. Method according to claim 5, wherein said measured distance information is indicative of the distance from the centre of said optical system to the corresponding object point.

7. Method according to claim 1, wherein a grey value is associated with each image point.

8. Method according to claim 4, wherein the coordinates of said predetermined vectors expressed in reference coordinate system are transformed to another coordinate system.

9. Method according to claim 1, further including the step of detecting and classifying at least one vehicle occupant of an automotive occupant protection system with said measured distance information.

* * * * *